United States Patent
Tronc et al.

(10) Patent No.: US 9,462,595 B2
(45) Date of Patent: Oct. 4, 2016

(54) METHOD FOR IDENTIFYING REUSABLE MULTIPLEXING RESOURCES AND TELECOMMUNICATIONS SYSTEM

(71) Applicant: ASTRIUM SAS, Suresnes (FR)

(72) Inventors: Jerome Tronc, Saint Jean (FR); Vincent Deslandes, Toulouse (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 215 days.

(21) Appl. No.: 14/351,135

(22) PCT Filed: Oct. 12, 2012

(86) PCT No.: PCT/EP2012/070252
§ 371 (c)(1),
(2) Date: May 28, 2014

(87) PCT Pub. No.: WO2013/053884
PCT Pub. Date: Apr. 18, 2013

(65) Prior Publication Data
US 2014/0321358 A1    Oct. 30, 2014

(30) Foreign Application Priority Data

Oct. 14, 2011    (FR) .................................... 11 03145

(51) Int. Cl.
| | | |
|---|---|---|
| H04W 72/08 | (2009.01) | |
| H04W 72/04 | (2009.01) | |
| H04B 7/185 | (2006.01) | |

(52) U.S. Cl.
CPC ....... *H04W 72/082* (2013.01); *H04B 7/18513* (2013.01); *H04B 7/18565* (2013.01); *H04B 7/18591* (2013.01); *H04W 72/04* (2013.01)

(58) Field of Classification Search
CPC .......... H04B 7/18513; H04B 7/18565; H04B 7/18591; H04W 72/082; H04W 72/04
See application file for complete search history.

(56) References Cited

U.S. PATENT DOCUMENTS

| 3,195,047 A  *  | 7/1965 | Ruthroff .............. H04B 14/006 455/44 |
| 2003/0054814 A1 * | 3/2003 | Karabinis ............. H04W 16/02 455/427 |

(Continued)

FOREIGN PATENT DOCUMENTS

| EP | 0820160 A2 | 1/1998 |
| WO | 02065535 A2 | 8/2002 |
| WO | 2006065584 A2 | 6/2006 |

*Primary Examiner* — Kwang B Yao
*Assistant Examiner* — Moo Ryong Jeong
(74) *Attorney, Agent, or Firm* — IM IP Law PLLC; C. Andrew Im

(57) ABSTRACT

A method and telecommunications system for identifying uplink multiplexing resources of a multi-beam satellite that are usable in a land-based telecommunications system, e.g., a transmitting station for transmitting radio signals to a receiving station. The transmitting station or the receiving station being a base station having a range defining a coverage area. For a given uplink multiplexing resource, a maximum allowable interference level, with respect to the satellite, for radio-electric signals transmitted from the coverage area is estimated. A potential interference level of the transmitting station is estimated. The transmitting station determines the usability of the given uplink multiplexing resource by comparing the potential interference level with the maximum allowed interference level for the given uplink multiplexing resource.

14 Claims, 5 Drawing Sheets

(56) References Cited

U.S. PATENT DOCUMENTS

Figure 1:
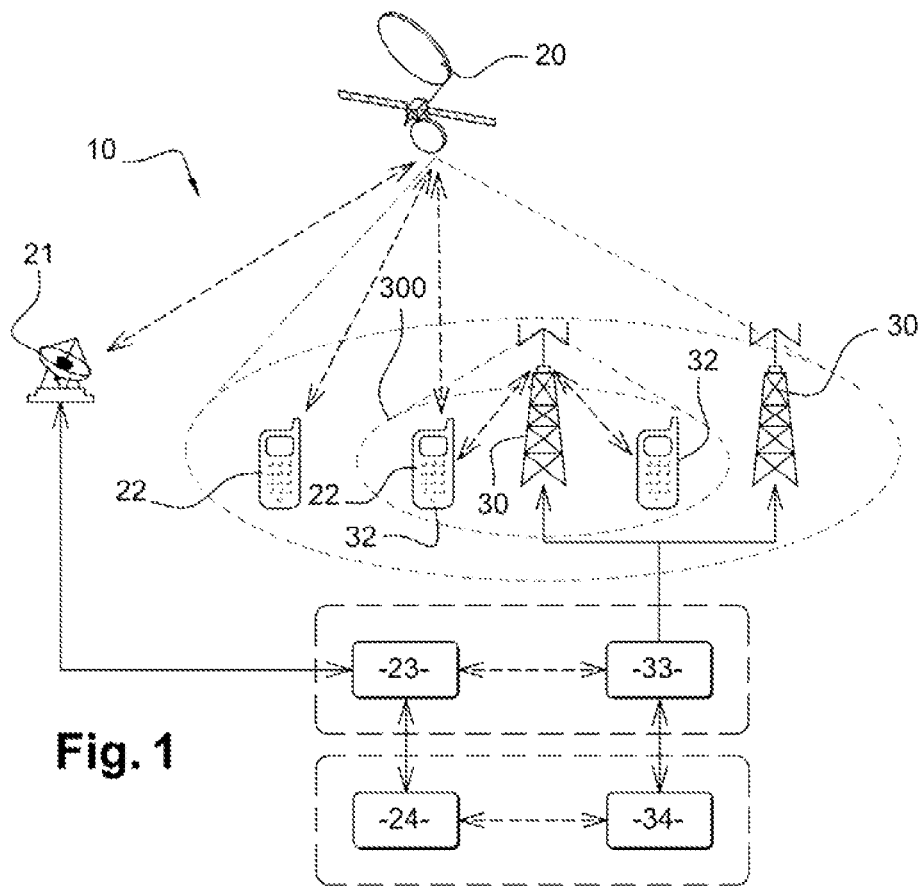

| | | | |
|---|---|---|---|
| 2006/0135070 A1* | 6/2006 | Karabinis | H04B 7/18513 455/63.1 |
| 2006/0205367 A1 | 9/2006 | Karabinis | |
| 2007/0135051 A1* | 6/2007 | Zheng | H04B 7/18563 455/63.1 |
| 2009/0042509 A1* | 2/2009 | Karabinis | H04B 7/18513 455/12.1 |
| 2011/0034166 A1 | 2/2011 | Karabinis et al. | |

* cited by examiner

METHOD FOR IDENTIFYING REUSABLE MULTIPLEXING RESOURCES AND TELECOMMUNICATIONS SYSTEM

RELATED APPLICATIONS

This application is a §371 application from PCT/EP2012/070252 filed Oct. 12, 2012, which claims priority from French Patent Application No. 11 03145 filed Oct. 14, 2011, each of which is herein incorporated by reference in its entirety.

TECHNICAL FIELD

The present invention belongs to the field of mobile telecommunications, and relates more particularly to the sharing of frequency channels, between a satellite telecommunications system and a terrestrial telecommunications system.

PRIOR ART

Nowadays, different frequency channels are generally allocated to terrestrial telecommunications systems and to satellite telecommunications systems, so as in particular to limit interference between these various systems.

However, the regulating authorities of certain countries or regions, in particular the United States, Europe and South Korea, have henceforth authorized reuse of certain satellite frequency channels by terrestrial telecommunications systems. For example, the reuse of frequency channels traditionally allocated to satellite communications (L or S bands) at the level of the terrestrial component has been authorized in some telecommunications systems, called "integrated systems", comprising both a satellite component and a terrestrial component.

Integrated telecommunications systems such as these are also known by the name "hybrid satellite/terrestrial systems". The interest in integrated telecommunications systems such as these resides in particular in the complementarity of the capabilities offered by the satellite component and terrestrial component. In particular, the terrestrial component is generally capable of offering denser coverage in urban areas than the satellite component, and complementary coverage inside buildings.

In a more general manner, authorization of total or partial reuse of satellite frequency channels by exclusively terrestrial telecommunications systems (that is to say not comprising any satellite component) could be envisaged, on account in particular of the strong growth in the volume of terrestrial telecommunications.

However, it is understood that such a reuse of satellite frequency channels by a terrestrial telecommunications system generates interference between the terrestrial communications and the satellite communications, interference that ought to be controlled.

Patent application US 2011/0034166 describes an integrated telecommunications system, as well as mechanisms for organizing the sharing of the same frequency channels between the satellite component and the terrestrial component of said integrated system.

However, the mechanisms described in patent application US 2011/0034166 are aimed at minimizing the interference experienced in a frequency channel by a terrestrial terminal on account of the use of this same frequency channel by a satellite. This patent application does not address the problem of the interference experienced in a frequency channel by the satellite on account of the use of this same frequency channel by the terrestrial component of the integrated telecommunications system.

However, this problem is particularly significant from a practical point of view since, nowadays, main consideration is given to the reuse of frequency channels traditionally reserved for satellite communications for terrestrial telecommunications systems. Consequently, this reuse must preferably be done while controlling the interference on any existing satellite telecommunications system.

OBJECT AND SUMMARY OF THE INVENTION

The objective of the present invention is to remedy all or some of the limitations of the solutions of the prior art, in particular those set forth hereinabove, by proposing a solution which makes it possible to control the level of interference experienced by a satellite on account of a use of a satellite frequency channel by a terrestrial telecommunications system.

Furthermore, the objective of the present invention is also to propose a solution which can, in certain cases, be implemented in a manner transparent to the satellite telecommunications system, without requiring coordination with the terrestrial telecommunications system. This makes it possible to be applicable, including when the satellite telecommunications system and the terrestrial telecommunications system are independent of one another.

For this purpose, and according to a first aspect, the invention relates to a method for identifying uplink multiplexing resources of a multi-beam satellite that can be used in a terrestrial telecommunications system by a transmitting station to transmit radio-electric signals to a receiving station, in which said transmitting station or said receiving station is a base station having a range delimiting a zone of coverage, and different beams of the satellite use different uplink multiplexing resources. Furthermore, said method comprises, for each uplink multiplexing resource considered, the steps of:
- estimation of a maximum interference level authorized with respect to the satellite for this uplink multiplexing resource for radio-electric signals transmitted from the zone of coverage,
- estimation of a potential level of interference of the transmitting station situated in the zone of coverage,
- determination whether this uplink multiplexing resource is usable by the transmitting station by comparing the potential level of interference of the transmitting station with the maximum interference level authorized for this uplink multiplexing resource.

In particular modes of implementation, the identification method can comprise one or more of the following characteristics, taken in isolation or in accordance with all the possible combinations.

In a particular mode of implementation, for each uplink multiplexing resource considered, the step of estimating the maximum interference level authorized comprises the substeps of:
- measurement, by a terrestrial device situated in the zone of coverage under predetermined conditions of visibility with the satellite, called the "reference device", of the level of reception of radio-electric signals transmitted by the satellite in the beam using this uplink multiplexing resource, called the "reference reception level",
- determination of the maximum interference level authorized for this uplink multiplexing resource as a function of the reference reception level measured for this uplink multiplexing resource.

In a particular mode of implementation, for each uplink multiplexing resource considered:

said method comprises a step of transmission by the satellite, in the beam using this uplink multiplexing resource, of a specific pilot signal $S_x$ associated with this uplink multiplexing resource, the reference reception level for this uplink multiplexing resource corresponds to the reception level of the pilot signal $S_x$ associated with this uplink multiplexing resource.

In a particular mode of implementation, said method comprises, for each uplink multiplexing resource considered, the steps of:

measurement of the interference level generated by transmitting stations using this uplink multiplexing resource, called the "real interference level", updating of the transmission power of the pilot signal $S_x$ associated with this uplink multiplexing resource, in the course of which said transmission power of said pilot signal $S_x$ is adjusted as a function of the real interference level measured for this uplink multiplexing resource.

In a particular mode of implementation, the step of estimating the potential level of interference of the transmitting station comprises the sub-steps of:

estimation of the power with which the radio-electric signals will be transmitted by the transmitting station, called the "radiation power", measurement, by the transmitting station, of the level of reception of radio-electric signals transmitted by the satellite, called the "real reception level", determination of the potential level of interference of the transmitting station as a function of the real reception level measured and of the estimated radiation power of said transmitting station.

According to a second aspect, the invention relates to a terrestrial telecommunications system comprising a transmitting station and a receiving station which are adapted to exchange data by using uplink multiplexing resources of a multi-beam satellite, said transmitting station or said receiving station is a base station having a range delimiting a zone of coverage. Furthermore, said terrestrial telecommunications system comprises:

means for estimating, for each uplink multiplexing resource considered, a maximum interference level authorized with respect to the satellite for radio-electric signals transmitted from the zone of coverage, means for estimating a potential level of interference of the transmitting station situated in the zone of coverage, means for determining whether an uplink multiplexing resource is usable by the transmitting station by comparing the potential level of interference of the transmitting station with the maximum interference level authorized for this uplink multiplexing resource.

In particular embodiments, the terrestrial telecommunications system can comprise one or more of the following characteristics, taken in isolation or in accordance with all the possible combinations.

In a particular embodiment, the means for estimating a maximum interference level authorized for each uplink multiplexing resource comprise a terrestrial device that is situated or that can be placed in the zone of coverage under predetermined conditions of visibility with the satellite, called the "reference device", said reference device comprising means for measuring levels of reception of radio-electric signals transmitted in downlink multiplexing resources of the satellite.

In a particular embodiment, the means for estimating the potential level of interference of the transmitting station comprise:

means for estimating the radiation power of the transmitting station, means for measuring a level of reception by the transmitting station of radio-electric signals transmitted by the satellite, called the "real reception level", means for determining the potential level of interference of the transmitting station as a function of the measured real reception level and of the estimated radiation power.

According to a third aspect, the invention relates to an integrated telecommunications system comprising a space component comprising a multi-beam satellite and a terrestrial component in accordance with a terrestrial telecommunications system according to any one of the embodiments of the invention.

In a particular embodiment, the space component comprises means for transmitting a specific pilot signal in each beam of the satellite.

In a particular embodiment, the space component comprises means for updating the transmission power of each pilot signal as a function of measurements of the level of aggregated interference of the transmitting stations using uplink multiplexing resources, called the "real interference level", said means being configured to adjust the transmission power of the pilot signal associated with an uplink multiplexing resource as a function of the real interference level measured in this uplink multiplexing resource.

PRESENTATION OF THE FIGURES

Figure 2:
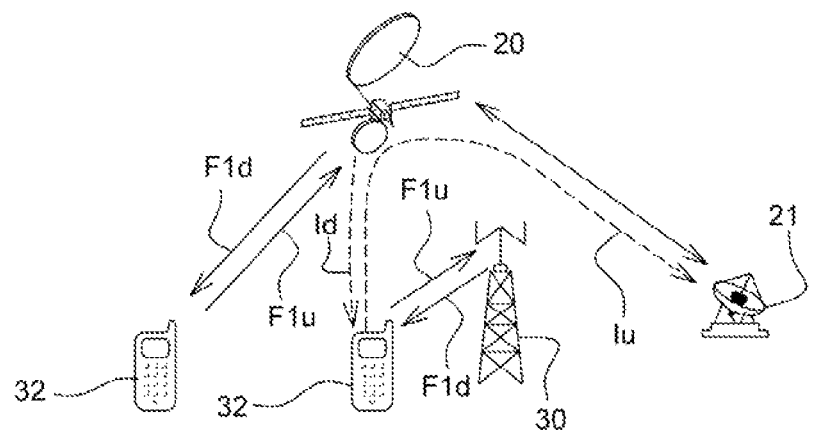
Figure 3:
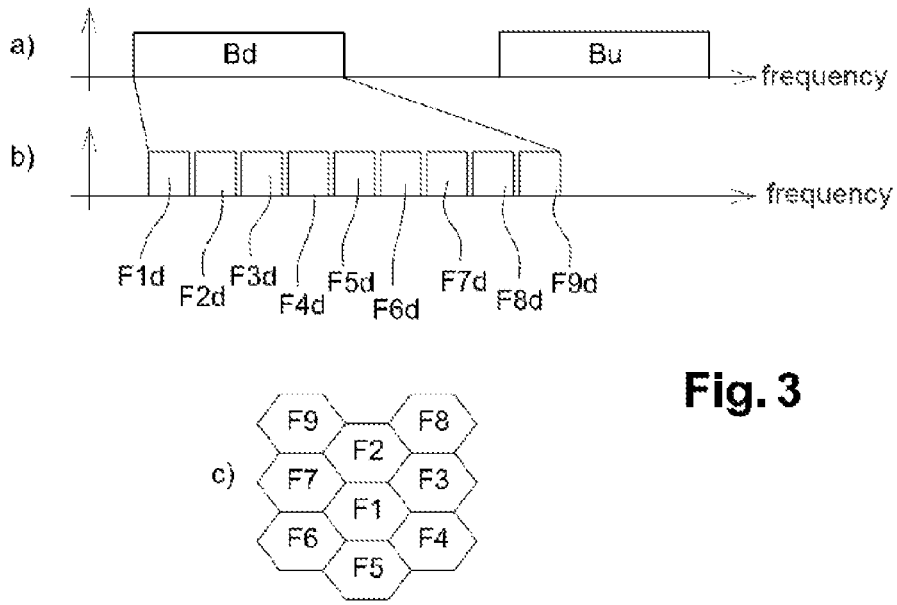
Figure 4:
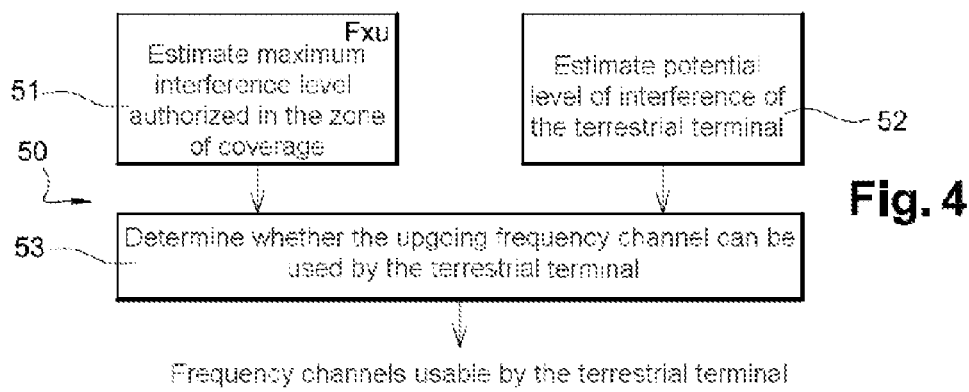
Figure 5:
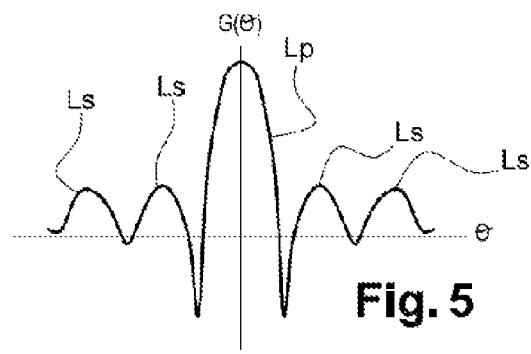
Figure 6:
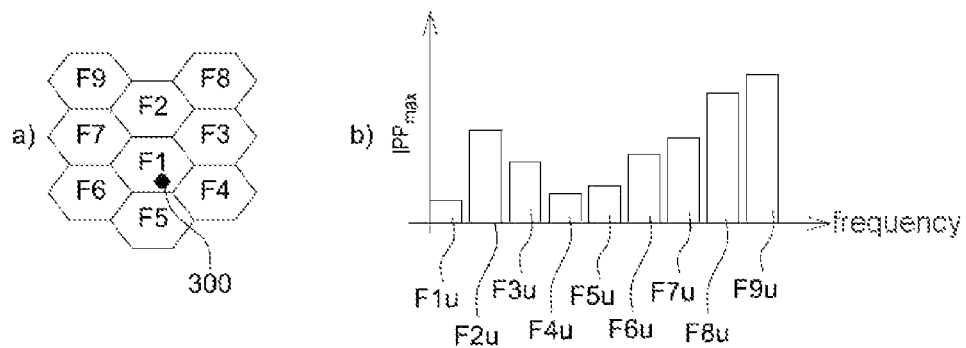
Figure 7:
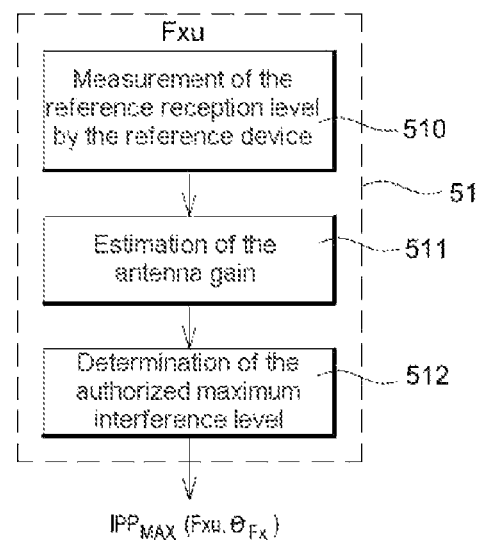
Figure 8:
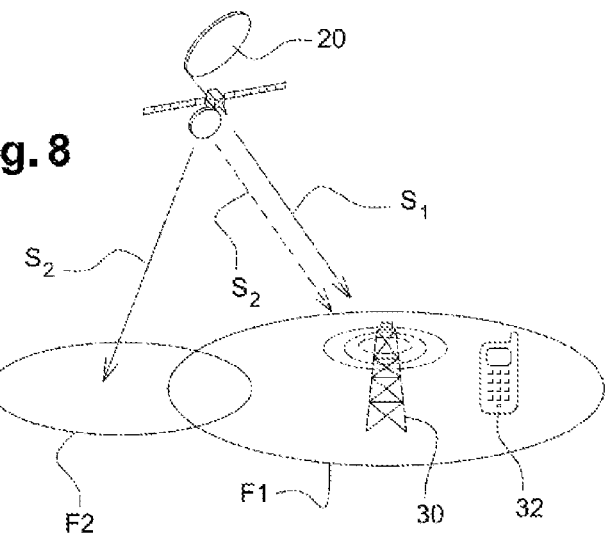
Figure 9:
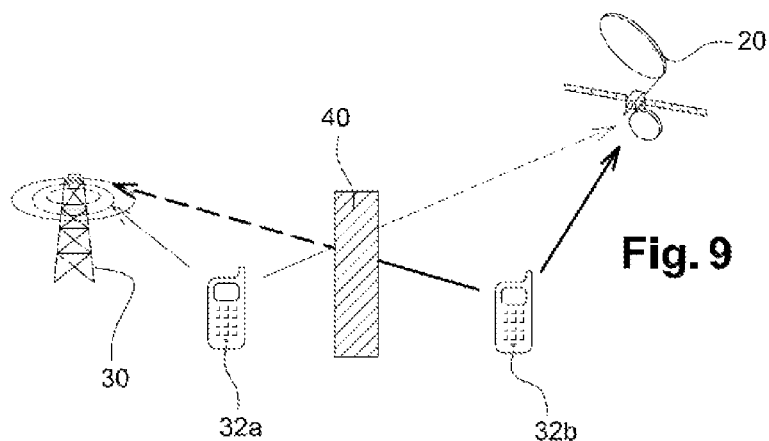
Figure 10:
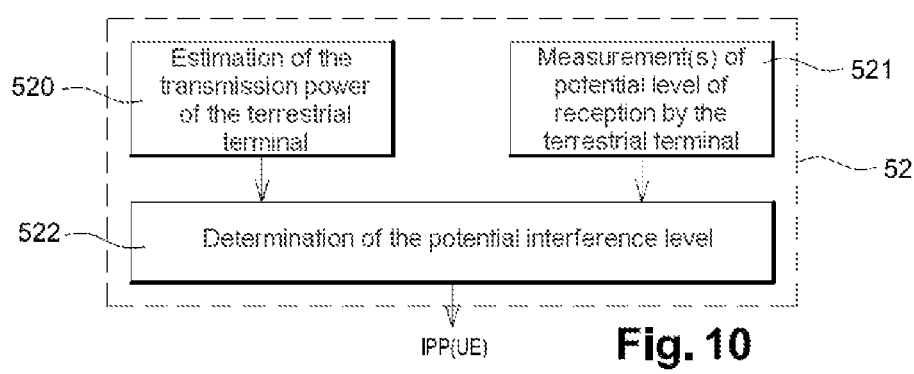
Figure 11:
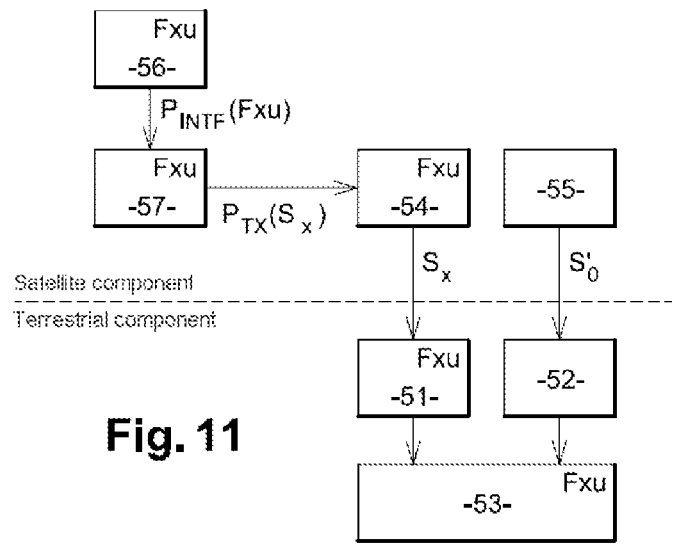
Figure 12:
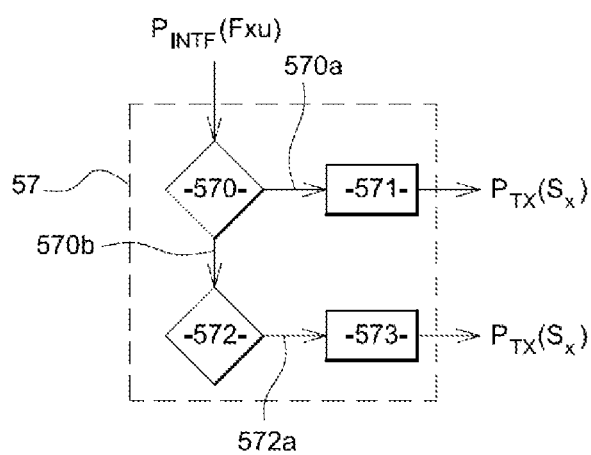
Figure 13:
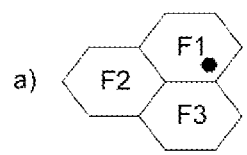
Figure 13:
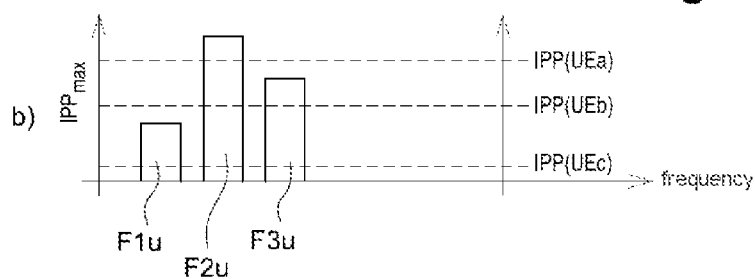

The invention will be better understood on reading the following description, given by way of wholly non-limiting example, and while referring to the figures which represent:

FIG. 1: a schematic representation of an integrated telecommunications system,

FIG. 2: a schematic representation of the main interference paths related to the reuse of satellite frequency channels, FIG. 3: an exemplary use of various frequency channels by a multi-beam satellite, FIG. 4: a chart representing the main steps of a method for identifying satellite frequency channels usable for terrestrial communications, FIG. 5: a radiation pattern of a satellite beam, FIG. 6: an example illustrating the variation of an authorized maximum interference level from one frequency channel to another, FIG. 7: a chart representing a preferred mode of implementation of a step of estimating maximum interference level authorized with respect to a satellite, FIG. 8: an example illustrating the use of pilot signals for the estimation of authorized maximum interference levels, FIG. 9: an example illustrating the variation of the potential level of interference of a terrestrial terminal, FIG. 10: a chart representing a preferred mode of implementation of a step of estimating the potential level of interference of a terrestrial terminal, FIG. 11: a chart representing a preferred mode of implementation of the identification method, FIG. 12: a chart representing a preferred mode of implementation of an updating step of the identification method of FIG. 11, and FIG. 13: an example illustrating the allocation of uplink satellite frequency channels to terrestrial terminals.

In these figures, references that are identical from one figure to another refer to identical or analogous elements. For the sake of clarity, the elements represented are not to scale, unless stated otherwise.

DETAILED DESCRIPTION OF THE INVENTION

FIG. 1 schematically represents an exemplary integrated telecommunications system 10 comprising a satellite component and a terrestrial component.

The satellite component comprises a satellite 20 in orbit above the Earth, for example in geostationary orbit (GEO).

The satellite 20 is a multi-beam satellite. A beam corresponds to a particular radiation pattern of the satellite 20, making it possible to service a particular geographical zone on the surface of the Earth. A multi-beam satellite can form a plurality of such beams, and consequently can simultaneously service a plurality of different geographical zones.

The satellite component also comprises terminals situated substantially on the surface of the Earth and capable of exchanging data with the satellite 20 in the form of radio-electric signals.

The expression terminals "substantially on the surface of the Earth" is intended to imply inter alia terrestrial, maritime or aeronautical user terminals.

The expression "radio-electric signal" is furthermore intended to imply an electromagnetic wave propagating via non-wired means, whose frequencies lie in the traditional spectrum of radio-electric waves (a few hertz to several hundred gigahertz) or in neighboring frequency bands.

The satellite 20 exchanges data with a ground station 21, in the form of radio-electric signals. The data exchanged correspond to data received from the terminals or destined for said terminals.

The satellite component also comprises a satellite access network 23 and a satellite core network 24, both of which the terminals access by way of the satellite 20 and of the ground station 21.

The terrestrial component comprises several base stations 30, as well as terminals substantially on the surface of the Earth and capable of exchanging data with said base stations 30.

More particularly, each base station 30 is capable of exchanging data with terminals situated in a zone of coverage of this base station 30, substantially delimited by the range of this base station. Such a zone of coverage is known by the name "cell" in cellular telecommunications systems (GSM, UMTS, CDMA 2000, LTE, etc.).

The terrestrial component also comprises a terrestrial access network 33 and a terrestrial core network 34, both of which the terminals access by way of the base stations 30.

The terrestrial access network 33 and the satellite access network 23 may be merged or comprise shared common devices. Likewise the terrestrial core network 34 and the satellite core network 24 may be merged or comprise shared common devices.

The terminals of the integrated telecommunications system 10 may be of several types.

In the subsequent description, the expression "satellite terminal" 22 is intended to mean:

- a terminal compatible solely with the satellite component, that is to say a terminal which is not able to exchange data with the base stations 30 of the terrestrial component, or
- a dual-mode terminal (compatible with the satellite component and with the terrestrial component) which is currently communicating with the satellite 20.

Furthermore, the expression "terrestrial terminal" 32 is intended to mean:

- a terminal compatible solely with the terrestrial component, that is to say a terminal which is not able to exchange data with the satellite 20 of the satellite component, or
- a dual-mode terminal which is currently communicating with a base station 30.

As indicated previously, the invention relates to the use of satellite frequency channels for terrestrial communications, that is to say for communications by way of a base station 30 of the terrestrial component.

The invention is firstly aimed at controlling the interference experienced by the satellite 20 on account of the fact that a satellite frequency channel, used in the satellite component, is also used in the terrestrial component.

In practice, the interference experienced by the satellite 20 will be maximum when radio-electric signals are transmitted in an uplink frequency channel of the satellite 20, that is to say used by the satellite to receive data from satellite terminals 20 and/or from the ground station 21.

In the subsequent description, in a non-limiting manner the case is considered wherein the satellite 20 uses different frequency channels for the uplink communications (from a satellite terminal 22 or from a ground station 21 to the satellite 20) and for the downlink communications (from the satellite 20 to a satellite terminal 22 or a ground station 21). This frequency multiplexing of the uplink and downlink communications is known by the acronym FDD for "Frequency Division Duplex".

Throughout the present application, "transmitting station" is intended to imply a device of the terrestrial component apt to transmit radio-electric signals in an uplink satellite frequency channel. Depending on the manner of reusing the satellite frequency channels for terrestrial communications, the transmitting station will correspond either to a terrestrial terminal 32, or to a base station 30.

FIG. 2 schematically represents an exemplary reuse of the satellite frequency channels for terrestrial communications, in which the same organization of the satellite frequency channels is retained for the terrestrial communications. This is intended to imply that a frequency channel used for the uplink (respectively downlink) satellite communications can be used only for the uplink (respectively downlink) terrestrial communications.

As illustrated by FIG. 2, a satellite terminal 22 exchanges data with a satellite 20 by way of a frequency channel F1u for the uplink communications and a frequency channel F1d for the downlink communications. In an analogous manner, a terrestrial terminal 32 exchanges data with a base station 30 by way of said frequency channel F1u for the uplink communications and of said frequency channel F1d for the downlink communications.

Under these conditions, the transmitting station corresponds to the terrestrial terminal 32 (path of interference Iu), the base station 30 then being a receiving station. Furthermore, the satellite 20 is also apt to create significant interference at the level of the terrestrial terminal 32 in the frequency channel F1d (interference path Id).

It is understood that other examples, in which the organization of the satellite frequency channels is not retained for the terrestrial communications, are possible. For example, the use of the frequency channels can be reversed in that an uplink (respectively downlink) satellite frequency channel is reused for downlink (respectively uplink) terrestrial communications. In such a case, the transmitting station is the base station 30.

In the subsequent description, in a non-limiting manner the case is considered wherein a frequency channel used for the uplink (respectively downlink) satellite communications can be used only for the uplink (respectively downlink) terrestrial communications.

FIG. 3 schematically represents an exemplary use of the various frequency channels by the satellite 20.

Part a) of FIG. 3 represents two frequency bands: a first frequency band Bd used for the downlink satellite communications and a second frequency band Bu used for the uplink satellite communications.

Part b) of FIG. 3 represents the organization in frequency channels of the first frequency band Bd, which comprises nine frequency channels F1d to F9d.

In an analogous manner, the second frequency band Bu is also organized into nine frequency channels F1u to F9u, associated respectively with the frequency channels F1d to F9d. Thus the uplink communication associated with a downlink communication using the frequency channel F1d is performed on the frequency channel F1u, the uplink communication associated with a downlink communication using the frequency channel F2d is performed on the frequency channel F2u, etc.

In the subsequent description, the expression "frequency channel F1" refers to the pair of frequency channels (F1d, F1u), the expression "frequency channel F2" refers to the pair of frequency channels (F2d, F2u), etc.

Part c) of FIG. 3 represents an example of the pattern organization of the beams of the satellite 20. More particularly, part c) of FIG. 3 represents the ground footprint of each of the beams of the satellite.

In this example, different beams of the satellite 20 use different frequency channels, so as to limit the interference between beams. The pattern of beams of part c) of FIG. 3 comprises by way of non-limiting example nine beams, each beam using a specific frequency channel among the frequency channels F1 to F9. Nothing precludes the satellite 20 from using patterns different from those illustrated by part c) of FIG. 3. Furthermore, several identical or different patterns may be juxtaposed. In this case, two different beams of the satellite 20 may use one and the same frequency channel, however, two adjacent beams use different frequency channels. It should be noted furthermore that the patterns may be static or dynamic.

Method for Identifying Reusable Frequency Channels

The present invention relates to an identification method 50 aimed at determining, at the level of the terrestrial component, which satellite frequency channels may be used for terrestrial communications without generating interference disturbing the satellite 20.

More particularly, the identification method 50 is aimed at determining which uplink satellite frequency channels may be used by a terrestrial terminal 32 (that is to say the transmitting station) to communicate with the base station 30 (that is to say the receiving station) in the zone of coverage 300 of which said terrestrial terminal is situated.

It should be noted that a frequency channel generally decomposes into several blocks of resources. A block of resources corresponds to the minimum unit of resources that is allocated to a terrestrial terminal. Thus, depending on the technology considered for multiplexing the various terrestrial terminals, a block of resources will correspond for example to a particular frequency sub-channel of the frequency channel considered (FDMA or "Frequency Division Multiple Access") and/or a particular time interval (TDMA or "Time Division Multiple Access") and/or a particular spreading code (CDMA or "Code Division Multiple Access"), etc.

Thus, once an uplink satellite frequency channel has been considered to be usable by a terrestrial terminal 32, the latter will be able to be allocated a particular block of resources on this frequency channel.

It should be noted that, when the terrestrial component uses the same splitting into blocks of resources as the satellite component, the method according to the invention can be implemented to directly identify which blocks of resources of a given frequency channel may be used by a terrestrial terminal 32. For the needs of the description of modes of implementation of the invention, in a non-limiting manner the case is considered wherein the method is implemented to identify the uplink satellite frequency channels usable for terrestrial communications, without seeking to distinguish the blocks of resources of one and the same frequency channel.

FIG. 4 schematically represents the main steps of such an identification method 50, which are, for an uplink satellite frequency channel Fxu (x=1 to 9) for which it is sought to determine whether it can be used for terrestrial communications:

51 estimation of a maximum interference level authorized with respect to the satellite 20 in this uplink frequency channel for radio-electric signals transmitted from the zone of coverage 300 of the base station 30,

52 estimation of a potential level of interference of the terrestrial terminal 32,

53 determination whether the uplink frequency channel is usable by the terrestrial terminal 32, by comparing the potential level of interference of said terrestrial terminal 32 with the maximum interference level authorized in this uplink frequency channel.

It should be noted that, if steps 51 and 53 are executed for each uplink frequency channel considered, the step 52 of estimating potential level of interference may be executed just once for all the uplink frequency channels considered, insofar as the potential interference level depends mainly on the terrestrial terminal 32 considered. The step 52 of estimating potential level of interference must on the other hand be executed for each terrestrial terminal considered.

On account of the estimation of a maximum interference level authorized in an uplink frequency channel, and of the estimation of the potential level of interference of the terrestrial terminal 32, a better control of the interference experienced by the satellite 20 will be possible. Indeed, an uplink frequency channel, for which a terrestrial terminal 32 would generate an interference level greater than the maximum interference level authorized in this uplink frequency channel, will not be able to be used by this terrestrial terminal 32.

In practice, the maximum interference levels authorized in each of the uplink frequency channels and the potential level of interference of the terrestrial terminal 32 will be able to be estimated as a function of measurements performed exclusively by terrestrial devices of the terrestrial component, and as a function of parameters that may be predefined. In particular, these estimations will be able to be performed without the satellite 20 performing any particular measurements (except optionally to influence the value of an authorized maximum interference level) and without particular coordination with said satellite.

Estimation of Maximum Authorized Level of Interference

The maximum interference level authorized in an uplink frequency channel is representative of the maximum power authorized in this uplink frequency channel before the formation of the beam using this uplink frequency channel, said beam formation carrying out a filtering whose response corresponds to the radiation pattern (or antenna gain) associated with this beam.

It is therefore understood that the maximum interference level authorized in an uplink satellite frequency channel will depend on the direction of arrival at the level of the satellite 20 of the radio-electric signals transmitted by the terrestrial terminal 32 in the zone of coverage 300. More particularly, the maximum interference level authorized in an uplink satellite frequency channel will depend on the angular gap between said direction of arrival and a direction of maximum gain of the radiation pattern associated with the beam using this uplink satellite frequency channel.

FIG. 5 schematically represents an exemplary radiation pattern of a beam.

More particularly, FIG. 5 represents the antenna gain $G(\theta)$ introduced as a function of the angular gap $\theta$ between the direction of maximum gain and the direction of arrival of radio-electric signals. It is noted that the radiation pattern exhibits several radiation lobes:

- a main lobe Lp whose ground footprint corresponds substantially to the geographical zone serviced by the beam,
- sidelobes Ls, of smaller amplitude than that of said main lobe Lp.

Generally, it is noted that, on average, the more the angular gap $\theta$ increases (that is to say the further removed the zone of coverage 300 of the base station 30 from the geographical zone serviced by the beam considered), the more the antenna gain $G(\theta)$ decreases. Thus, the beam formation is such that the radio-electric signals transmitted outside of the geographical zone serviced by the beam considered are more attenuated than radio-electric signals transmitted from this geographical zone.

For example, the maximum interference level authorized in the uplink frequency channel Fxu (x=1 to 9) is determined as being equal to within a constant to the following expression in decibels (dB):

$$IPP_{MAX}(Fxu, \theta_{Fx}) = I_{REF} - G_{EST}(Fxu, \theta_{Fx})) \quad (1)$$

in which expression:

$\theta_{Fx}$ is the angular gap between the direction of maximum gain of the beam using the frequency channel Fx and the direction of arrival of radio-electric signals transmitted from the zone of coverage 300, $IPP_{MAX}(Fxu, \theta_{Fx})$ is the maximum interference level authorized in the uplink frequency channel Fxu for radio-electric signals arriving with the angular gap $\theta_{Fx}$, $I_{REF}$ is a predetermined interference level authorized after formation of the beam, called the "reference interference level", $G_{EST}(Fxu, \theta_{Fx})$ is the estimation of the antenna gain $G(Fxu, \theta_{Fx})$ introduced by the formation of the beam associated with the uplink frequency channel Fxu for radio-electric signals arriving with the angular gap $\theta_{Fx}$.

The value $I_{REF}$ is for example predefined so that the signal-to-interference ratio (C/I) after beam formation remains greater than a predefined threshold value above which the performance of the uplink satellite communications are little degraded. Furthermore, provision may be made for a security margin to take account of a possible aggregation of interference generated by different terrestrial terminals. The choice of a suitable value, as a function of the performance required, is considered to be within the scope of the person skilled in the art.

Part a) of FIG. 6 represents the same organization of beams as part c) of FIG. 3, as well as the zone of coverage 300 of the base station 30, zone of coverage whose dimensions are smaller than those of the geographical zones serviced by the beams of the satellite.

The zone of coverage 300 considered is situated in the geographical zone serviced by the beam using the frequency channel F1. The geographical zone closest to the zone of coverage 300 is, after that serviced by the beam using the frequency channel F1, that serviced by the beam using the frequency channel F4. The geographical zone furthest removed from the zone of coverage 300 of the base station 30 is that serviced by the beam using the frequency channel F9.

Part b) of FIG. 6 represents the maximum interference levels authorized for each of the frequency channels F1u to F9u. It is noted that the lowest authorized maximum interference level is obtained for the frequency channel F1u, insofar as the zone of coverage 300 of the base station 30 is situated in the geographical zone serviced by the beam using the frequency channel F1. Thereafter, the immediately higher authorized maximum interference level is obtained for the frequency channel F4u, etc. The highest authorized maximum interference level is obtained for the frequency channel F9u.

In a preferred mode of implementation, the authorized maximum interference levels are estimated as a function of measurements performed by a terrestrial device, called the "reference device", situated in the zone of coverage 300 of the base station under predetermined conditions of visibility with the satellite 20.

The expression "predetermined conditions of visibility" is understood to imply that the reference device is substantially in conditions of direct visibility with the satellite 20 or, at least, that the difference between, on the one hand, the attenuation in conditions of direct visibility and, on the other hand, the attenuation between the satellite and the reference device is known a priori.

The expression "substantially in conditions of direct visibility" is understood to imply that no obstacle is situated between said reference device and the satellite 20, so that the radio-electric propagation channel between said satellite and said reference device is essentially single-path. Such is for example the case if the reference device is situated under the open sky and, in the case of a zone of coverage 300 in urban settings, high up (for example on the roof of a building, on a pylon, etc.).

The interest in considering predetermined conditions of visibility with the satellite 20 resides in the fact that, the attenuation between the satellite 20 and the reference device then being essentially known or determinable, it will be possible to estimate the antenna gain of each beam for radio-electric signals transmitted from the zone of coverage 300 of the base station 30. When conditions of direct visibility with the satellite 20 are furthermore considered, the propagation channel is then essentially single-path and fairly frequency non-selective, in contradistinction to multi-path propagation channels which may be very frequency selective, and for which the attenuation introduced could vary from one frequency channel to another.

Preferably, the reference device is the base station 30, or uses means of said base station 30. Indeed, the base station 30 is stationary and is usually substantially in conditions of direct visibility with the satellite 20. According to other examples, the reference device is a device that can be displaced from one zone of coverage of a base station 30 to another to perform, preferably under conditions of direct visibility with the satellite 20, measurements used to estimate the maximum interference levels authorized in each of these zones of coverage.

In a preferred mode of implementation, illustrated by FIG. 7, step 51 of estimating the authorized maximum interference level comprises, for each uplink frequency channel considered, the sub-steps of:
- 510 measurement by the reference device of the level of reception of radio-electric signals transmitted by the satellite 20 in the beam using the uplink frequency channel considered, called the "reference reception level",
- 511 estimation of the antenna gain introduced, by the formation of the beam using the uplink frequency channel considered, for radio-electric signals transmitted from the zone of coverage 300,
- 512 determination of the maximum interference level authorized for the uplink frequency channel considered as a function of the measured reference reception level.

In the subsequent description, in a non-limiting manner the case is considered wherein the terrestrial device is the base station 30 and the latter is in conditions of direct visibility with the satellite 20.

The reference reception levels measured in each of the downlink satellite frequency channels F1d to F9d in the course of measurement sub-steps 510 can for example be expressed in decibels in the following form:

$$P_{LOS}(Fxd) = P_{TX\_REF} + G(Fxd, \theta_F)) + ATT_{LOS}$$

in which expression:
- $\theta_{Fx}$ is the angular gap between the direction of maximum gain of the beam using the frequency channel Fx (x=1 to 9) and the direction of radio-electric signals destined for the zone of coverage 300 of the base station 30,
- $P_{LOS}(Fxd)$ is the reception level in direct visibility measured by the base station 30 in the downlink frequency channel Fxd,
- $P_{TX\_REF}$ is the reference transmission power of the satellite 20,
- $G(Fxd, \theta_{Fx})$ is the antenna gain introduced by the beam associated with the frequency channel Fxd for radio-electric signals destined for the zone of coverage 300,
- $ATT_{LOS}$ is the attenuation under conditions of direct visibility between the satellite 20 and the base station 30, considered to be known a priori to the terrestrial component (expressed in dB, the value of $ATT_{LOS}$ is negative).

In a non-limiting manner, it is considered that the reference transmission power $P_{TX\_REF}$ is the same in all the beams of the satellite 20, and that it is furthermore known to the terrestrial component. Nothing precludes, according to another non-limiting example, from calculating the maximum interference levels authorized to within the reference transmission power $P_{TX\_REF}$.

The antenna gain $G(Fxu, \theta_{Fx})$ is estimated, in the course of sub-step 511, by considering that the attenuations in the downlink frequency channel are the same as those in the uplink frequency channel. This approximation can be validly made in particular on account of the fact that, the measurements being carried out under conditions of direct visibility, the propagation channel is fairly frequency non-selective. It is furthermore considered that the antenna gain is the same in transmission as in reception, that is to say $G(Fxu, \theta_{Fx})) = G(Fxd, \theta_{Fx})$.

The antenna gain $G(Fxu, \theta_{Fx})$ is then for example estimated according to the following expression:

$$G_{EST}(Fxu, \theta_{Fx}) = P_{LOS}(Fxd) - P_{TX\_REF} - ATT_{LOS} \quad (2)$$

The authorized maximum interference levels are for example determined, in the course of sub-step 512, according to the expression (1) given previously.

Generally, the base station 30 can measure the reception level of any radio-electric signal transmitted by the satellite 20. In a preferred mode of implementation, illustrated by FIG. 8, specific predefined pilot signals $S_x$ (x=1 to 9 in the non-limiting case of the pattern with nine beams illustrated by part c) of FIG. 3) are associated with each of the beams and, the identification method 50 comprises, in each beam, a step 54 of transmitting the predefined pilot signal $S_x$ associated with each beam.

In the example illustrated by FIG. 8, a pilot signal $S_1$ is transmitted by the satellite 20 in the beam using the frequency channel F1, and a pilot signal $S_2$ is transmitted by the satellite 20 in the beam using the frequency channel F2. The base station 30 and its zone of coverage 300 are situated in the geographical zone serviced by the beam using the frequency channel F1, so that the reception level measured for the pilot signal $S_2$ is less than that measured for the pilot signal $S_1$.

These pilot signals must be able to be distinguished at the level of the base station 30 (or, in a more general manner, at the level of the reference device), so as to be able to distinguish the various beams.

Furthermore, the correspondence between, on the one hand, a given pilot signal and, on the other hand, the frequency channel or channels used in the beam associated with this pilot signal must be previously stored in a non-volatile memory of the terrestrial component (for example in the base station 30) so as to be able to determine for which frequency channels the authorized maximum interference levels have been measured (for example to determine, when the reception level of the pilot signal $S_1$ is measured, that this measurement is performed for the frequency channel F1, etc.).

The pilot signals $S_x$ (x=1 to 9) can take any form suited to their distinguishing by the base station 30. For example, two different pilot signals can use two different downlink satellite frequency channels, and/or two different spreading codes (technique known by the acronym CDMA for "Code Division Multiple Access"), etc.

Estimation of the Potential Level of Interference of the Terrestrial Terminal

The main parameters which influence the potential level of interference of the terrestrial terminal 32 are illustrated by FIG. 9.

FIG. 9 represents in a schematic manner a base station 30, a satellite 20 and two terrestrial terminals: a first terrestrial terminal 32a and a second terrestrial terminal 32b. An obstacle 40 strongly attenuates the radio-electric signals between the first terrestrial terminal 32a and the satellite 20, and the radio-electric signals between the second terrestrial terminal 32b and the base station 30 (strongly attenuated radio-electric signals are represented in a schematic manner in FIG. 9 by dashed lines).

The radio-electric signals between the second terrestrial terminal 32b and the satellite 20 are little attenuated, said second terrestrial terminal being for example substantially in conditions of direct visibility with said satellite 20. On account of this weak attenuation, the radio-electric signals transmitted by the second terrestrial terminal 32b are liable to generate significant interference at the level of the satellite 20.

Furthermore, the radio-electric signals between the second terrestrial terminal 32b and the base station 30 being strongly attenuated, the second terrestrial terminal 32b is liable to transmit with a high power, so as to compensate this strong attenuation. This also contributes to generating significant interference at the level of the satellite 20. Consequently, the potential level of interference of the second terrestrial terminal 32b is high.

On the other hand, the potential level of interference of the first terrestrial terminal 32a is weaker, insofar as:
  the radio-electric signals are little attenuated between the first terrestrial terminal 32a and the base station 30, so that the transmission power of the first terrestrial terminal 32a will be able to be less than that of the second terrestrial terminal 32b,
  the radio-electric signals are more attenuated between the first terrestrial terminal 32a and the satellite 20, than between the second terrestrial terminal 32b and said satellite.

It emerges therefrom that the potential level of interference of a terrestrial terminal 32 depends mainly on the attenuation between this terrestrial terminal 32 and the satellite 20, and on the transmission power of said terrestrial terminal.

In a preferred mode of implementation, illustrated by FIG. 10, step 52 of estimating the potential level of interference of the terrestrial terminal 32 comprises the sub-steps of:
  520 estimation of the power with which the radio-electric signals will be transmitted by the terrestrial terminal 32 toward the base station 30, called the "radiation power",
  521 measurement, by the terrestrial terminal 32, of the level of reception of radio-electric signals transmitted by the satellite 20 in downlink frequency channels, called the "real reception level",
  522 determination of the potential level of interference of the terrestrial terminal 32 as a function of the real reception level measured and of the estimated radiation power of said terrestrial terminal.

The radiation power of the terrestrial terminal 32 can be estimated in several ways, and it is understood that the choice of a particular algorithm merely constitutes a variant of implementation of the invention.

According to a first non-limiting example, provision is made for an information exchange protocol by which the terrestrial terminal 32 notifies the base station 30 and the terrestrial access network of the radiation power with which radio-electric signals are liable to be transmitted. The radiation power communicated is for example the maximum radiation power (to consider the worst case as regards the generation of interference) or, if a prior communication took place with the base station 30 (for example in a frequency channel reserved for terrestrial communications), the radiation power with which the radio-electric signals have been transmitted in the course of this prior terrestrial communication.

According to a second non-limiting example, applicable in the case of a prior terrestrial communication with the base station 30, the terrestrial terminal 32 measures the level of reception of radio-electric signals transmitted by the base station 30 and notifies said base station 30 of the measured level in the form of an indicator of quality of the channel (known by the acronym CQI for "Channel Quality Indicator"). Such mechanisms for notifying the measured level are already provided for in the main terrestrial telecommunications systems. Furthermore, the base station 30, which knows its own radiation power, can deduce from the level measured by the terrestrial terminal 32 the attenuation between said terrestrial terminal and said base station. By measuring the reception level of the radio-electric signals transmitted by the terrestrial terminal 32, the base station 30 can estimate the radiation power of said terrestrial terminal, having regard to the attenuation between said terrestrial terminal and said base station.

Furthermore, in accordance with other examples, nothing precludes the potential interference level from being estimated directly by the terrestrial terminal 32, in which case the latter, which already performs the measurement of the real reception level, can determine its own transmission power directly.

Preferably, specific predefined pilot signals $S'_x$ (x=1 to 9) are associated with each of the beams and, in each beam, the satellite 20 comprises a step 55 of transmitting the predefined pilot signal associated with each beam. Advantageously, the pilot signals $S'_x$ are the same as those used to measure the maximum interference levels authorized, that is to say the pilot signals $S_x$ illustrated by FIG. 8.

The terrestrial terminal 32 then measures the reception levels for each pilot signal and chooses a reference pilot signal $S_{REF}$ as being the pilot signal $S'_x$ for which the maximum reception level has been measured. The real reception level is then estimated as being the reception level measured for said reference pilot signal.

The real reception level can then be expressed in dB in the following form:

$$P_{REAL}=P'_{TX\_REF}+G(S_{REF},\theta_{REF})+ATT_{REAL}(UE)$$

in which expression:
  $P_{REAL}$ is the real reception level for the terrestrial terminal 32,
  $P'_{TX\_REF}$ is the reference transmission power of the satellite 20 for the transmission of the pilot signals $S'_x$ (x=1 to 9),
  $\theta_{REF}$ is the angular gap between the direction of maximum gain of the beam in which the reference pilot signal $S_{REF}$ is transmitted and the direction of radio-electric signals destined for the zone of coverage 300 of the base station 30,
  $G(S_{REF}, \theta_{REF})$ is the antenna gain introduced by the beam in which the reference pilot signal $S_{REF}$ is transmitted for radio-electric signals destined for the zone of coverage 300,
  $ATT_{REAL}(UE)$ is the real attenuation experienced between the satellite 20 and the terrestrial terminal 32, which varies from one terrestrial terminal to another (expressed in dB, the value of $ATT_{REAL}(UE)$ is negative).

In a non-limiting manner, it is considered that the reference transmission power $P'_{TX\_REF}$ is the same for all the pilot signals $S'_x$, and that it is furthermore known to the terrestrial component. In accordance with another non-limiting example, nothing precludes from calculating the potential level of interference of the terrestrial terminal considered to within the reference transmission power $P'_{TX\_REF}$. Furthermore, nothing precludes from having $P'_{TX\_REF}$ equal to $P_{TX\_REF}$.

The antenna gain $G(S_{REF}, \theta_{REF})$ can be estimated. For example, the base station 30 (in the guise of reference device) can measure the reception level of the reference pilot signal $S_{REF}$:

$$P_{LOS}(S_{REF})=P'_{TX\_REF}+G(S_{REF},\theta_{REF})+ATT_{LOS}$$

Thereafter, the estimation $G_{EST}(S_{REF}, \theta_{REF})$ can be determined in accordance with the following expression:

$$G_{EST}(S_{REF}, \theta_{REF}) = P_{LOS}(S_{REF}) - P'_{TX\_REF} - ATT_{LOS}$$

The potential level of interference of the terrestrial terminal 32 is for example determined, in the course of sub-step 522, in accordance with the expression:

$$IPP(UE) = EIRP(UE) + P_{REAL} - P'_{TX\_REF} - G_{EST}(S_{REF}, \theta_{REF})$$

this amounting to:

$$IPP(UE) = EIRP(UE) + ATT_{REAL}(UE)$$

in which expressions:
- IPP(UE) is the potential level of interference of the terrestrial terminal,
- EIRP(UE) is the estimated radiation power ("equivalent isotropically radiated power" or EIRP) of the terrestrial terminal 32.

In an alternative, for the measurement of the real reception level $P_{REAL}$, on dispatching specific pilot signals $S'_x$ (x=1 to 9) in each of the beams, one and the same global pilot signal $S'_0$ can be dispatched simultaneously in all the beams, the real reception level $P_{REAL}$ then being the reception level measured for said global pilot signal $S'_0$. In that case, the base station 30 (in the guise of reference device) also measures the reception level of the global pilot signal $S'_0$ so as to estimate the contribution of the antenna gain. In a variant, the global pilot signal $S'_0$ is transmitted in a global beam whose zone of coverage encompasses the zones of coverage of the beams using the frequency channels Fx (x=1 to 9).

Comparison of the Maximum Interference Levels Authorized with the Potential Level of Interference of the Terrestrial Terminal In the course of step 53, the maximum interference level authorized in a given uplink frequency channel is compared with the potential level of interference of the terrestrial terminal 32. This comparison step is performed for each uplink frequency channel for which it is sought to determine whether it can be used for terrestrial communications.

For example, the uplink frequency channel Fxu (x=1 to 9) is considered to be usable by the terrestrial terminal 32 to exchange data with the base station 30 if the following relation is satisfied:

$$IPP(UE) < IPP_{MAX}(Fxu)$$

All the uplink frequency channels whose use could disturb the proper operation of the satellite 20 are thus eliminated, for a given terrestrial terminal 32.

Preferred Mode of Implementation of the Identification Method 50

FIG. 11 schematically represents a preferred mode of implementation of the identification method 50.

In this mode of implementation, authorized maximum interference levels are estimated as a function of reference reception levels measured for specific predefined pilot signals $S_x$ (x=1 to 9) transmitted in the beams of the satellite. For each beam, the identification method 50 comprises a step 54 of transmitting in this beam the corresponding pilot signal $S_x$.

Furthermore, the potential level of interference of the terrestrial terminal 32 is estimated as a function of the real reception level measured for a global pilot signal $S'_0$. For this purpose, the identification method 50 comprises a step 55 of transmitting the global pilot signal $S'_0$ in all the beams or in a global beam whose zone of coverage encompasses the zones of coverage of said beams.

In the mode illustrated by FIG. 11, the identification method 50 also comprises, for each uplink frequency channel considered, the following steps:
- 56 measurement, by the satellite 20 or the ground station 21, of the aggregated level of interference generated by terrestrial terminals 32 using this uplink frequency channel, called the "real interference level",
- 57 updating of the transmission power of the pilot signal $S_x$ associated with this uplink frequency channel.

FIG. 12 represents a non-limiting example of step 57 of updating the transmission power of a pilot signal $S_x$.

As illustrated by FIG. 12, the updating step 57 comprises a sub-step 570 of determining whether the real interference level $P_{INTF}(Fxu)$ measured in the uplink frequency channel Fxu in the beam associated with the pilot signal $S_x$ is greater than a first predefined threshold value V1, for example equal to the reference interference level $I_{REF}$.

When the real interference level is greater than the first threshold value V1 (reference 570a in FIG. 12), the updating step 57 comprises a sub-step 571 of increasing the transmission power of the pilot signal $S_x$ considered by a predefined value AP (for example equal to 1 dB or 2 dB).

When the real interference level is equal to or less than the threshold value V1 (reference 570b), the updating step 57 comprises a sub-step 572 of determining whether the real interference level measured in the beam associated with the pilot signal $S_x$ considered is less than a second predefined threshold value V2, strictly less than the first threshold value V1.

When the real interference level is less than the second threshold value V2 (reference 572a), the updating step 57 comprises a sub-step 573 of decreasing the transmission power of the pilot signal $S_x$ considered by a predefined value Δ'P (for example equal to the value Δ'P).

When the real interference level is equal to or greater than the second threshold value V2, the transmission power of the pilot signal $S_x$ considered is not modified.

It should be noted that the estimation of the potential level of interference of a terrestrial terminal 32 makes it possible to ensure that this terrestrial terminal 32 will not by itself generate too much interference with respect to the satellite 20. However, it may happen that different terrestrial terminals 32 use the same uplink satellite frequency channel, for example when these terrestrial terminals 32 are situated in zones of coverage of different base stations 30. The interference generated by each of these terrestrial terminals 32 will therefore be compounded at the level of the satellite 30 so that the real interference level might turn out to be greater than the reference interference level $I_{REF}$, even when the latter already provides a margin for alleviating this compounding.

The steps 56 of measurement and 57 of updating of the transmission power of the pilot signals $S_x$ allow better control of the interference experienced by the satellite 20 on account of the use of uplink satellite frequency channels by terrestrial terminals 32 for terrestrial communications. Indeed, it is understood that, when the real interference level measured is greater than the reference interference level $I_{REF}$, the transmission power of the corresponding pilot signal $S_x$ will be increased. It will then follow from this that the maximum interference level authorized will for its part be reduced as indicated hereinafter.

Indeed, in this case the reference reception level can be expressed:

$$P_{LOS}(S_x) = P_{TX}(S_x) + G(Fxd, \theta_{Fx}) + ATT_{LOS}$$

in which expression:
- $P_{LOS}(Sx)$ is the reception level in direct visibility of the pilot signal considered $S_x$,
- $P_{TX}(S_x)$ is the transmission power of the pilot signal $S_x$, which may be different from the reference transmission power $P_{TX\_REF}$.

Consequently the estimation $G_{EST}(Fxu, \theta_{Fx})$, determined in accordance with the expression (2) hereinabove, will be equal to:

$$G_{EST}(Fxu,\theta_{Fx})=G(Fxd,\theta_{Fx})-P_{TX\_REF}+P_{TX}(S_x)$$

and the maximum interference level authorized in the frequency channel Fxu will be equal to:

$$IPP_{MAX}(Fxu,\theta_{Fx})=I_{REF}-G(Fxd,\theta_{Fx})+P_{TX\_REF}-P_{TX}(S_x)$$

It is therefore understood that increasing the transmission power $P_{TX}(S_x)$ of the pilot signal $S_x$ associated with the frequency channel Fxu leads to a decrease in the maximum interference level authorized in this uplink frequency channel. This uplink frequency channel will no longer be usable by certain terrestrial terminals 32, so that the real interference level experienced by the satellite 20 will decrease.

Thus, better control of the interference experienced by the satellite 20 is obtained. The following advantages are furthermore noted:
- the control of the level of the interference can be done individually beam by beam, insofar as it is possible to modify the transmission power of just the pilot signal $S_x$ of the beam in which the real interference level measured is too significant,
- this control is obtained without interconnection between the satellite component and the terrestrial component,
- when an uplink frequency channel is not used by a satellite terminal, it is possible to lower, in the beam associated with this uplink frequency channel, the transmission power $P_{TX}(S_x)$ of the corresponding pilot signal to the minimum (including as far as to consider a zero transmission power), the effect of which will be to increase the maximum interference level authorized in this uplink frequency channel and consequently to favor the reuse thereof for terrestrial communications.

In an alternative exemplary implementation, the step 57 of updating the transmission power of the pilot signals is replaced with a step of updating the value of the reference interference level $I_{REF}$ as a function of the measurements of real levels of interference performed by the satellite component. For example, if the real interference level measured is greater than the first threshold value V1, in this case the value of the reference interference level $I_{REF}$ would be decreased directly, which would also lead to a decreasing of the authorized maximum interference level. However, this alternative exemplary implementation requires coordination between the satellite component (which measures the real levels of interference) and the terrestrial component (which uses the reference interference level $I_{REF}$).

Method for Allocating Frequency Channels

The method 50 for identifying uplink satellite frequency channels being usable for terrestrial communications can be combined with any type of method for allocating resources.

FIG. 13 schematically represents an exemplary allocation of uplink satellite frequency channels.

Part a) of FIG. 13 represents a pattern comprising three beams using the frequency channels F1=(F1d, F1u), F2=(F2d, F2u) and F3=(F3d, F3u), as well as the zone of coverage 300 of the base station 30, which is situated in the geographical zone serviced by the satellite beam using the frequency channel F1.

Part b) of FIG. 13 represents, in the form of histograms, the maximum interference levels authorized $IPP_{MAX}$ in each of the frequency channels F1u, F2u and F3u, as well as the potential interference levels estimated for three terrestrial terminals: a first terrestrial terminal 32a (potential interference level denoted IPP(UEa)), a second terrestrial terminal 32b (IPP(UEb)) and a third terrestrial terminal 32c (IPP(UEc)).

As illustrated by part b) of FIG. 13:
- the uplink frequency channels usable by the first terrestrial terminal 32a are the frequency channels F1u, F2u and F3u,
- the uplink frequency channels usable by the second terrestrial terminal 32b are the frequency channels F2u and F3u,
- the lone uplink frequency channel usable by the third terrestrial terminal 32c is the frequency channel F2u.

Consequently, it is possible to allocate the frequency channel F2u to the third terrestrial terminal 32c. Hence, it is necessary to allocate the frequency channel F3u to the second terrestrial terminal 32b, and the frequency channel F1u to the first terrestrial terminal 32a. Other solutions could be envisaged, such as for example allocating a frequency channel reserved for terrestrial communications to the third terrestrial terminal 32c, insofar as the latter has the largest potential level of interference with respect to the satellite 20. If the third terrestrial terminal 32c is a dual-mode terminal, it could alternatively be forced to communicate directly with the satellite 20.

It should be noted that, in the case of frequency-multiplexed (FDD) uplink and downlink satellite communications, and in the case where the same organization is retained for the uplink and downlink terrestrial communications, the allocation of an uplink frequency channel (for example F1u) to a terrestrial terminal 32 preferably entails the allocation of the paired downlink frequency channel (that is to say F1d) to the base station 30. The limitation of the interference at the level of the satellite 20 will generally be accompanied by a limitation of the interference at the level of the terrestrial terminal 32 for the downlink communications insofar as a potential level of interference of a terrestrial terminal is weak if:
- the attenuation between the satellite 20 and the terrestrial terminal 32 is strong: consequently the radio-electric signals transmitted by the satellite 20 will also be strongly attenuated, and/or
- the transmission power of the terrestrial terminal 32 is weak: this is generally indicative of proximity with the base station 30 and/or of an absence of obstacles between said base station and the terrestrial terminal 32, so that the reception level of the radio-electric signals transmitted by said base station will generally be much greater than the interference generated by the satellite 20.

Furthermore, it is possible to allocate to the terrestrial terminals 32 closest to the base station 30 (weak estimated transmission power or high reception level of the radio-electric signals transmitted by the base station 30), the downlink frequency channels in which the satellite 20 is liable to generate the most significant interference (high real reception level).

Variants of the Invention

In a more general manner, the scope of the present invention is not limited to the modes of implementation and of embodiment described hereinabove by way of non-limiting examples, but extends on the contrary to all the modifications within the scope of the person skilled in the art.

In particular, it should be noted that the invention, described within the framework of a reuse of satellite frequency channels for terrestrial communications, is applicable in a general manner to any type of multiplexing resource.

The expression "multiplexing resource" is understood to imply the means making it possible to multiplex the uplink communications of adjacent beams of the satellite. Thus a multiplexing resource corresponds to a frequency channel, optionally combined with other means that can be implemented to distinguish the uplink communications of adjacent beams of the satellite.

According to a first example, detailed hereinabove, adjacent beams use different frequency channels. In this case, a frequency resource corresponds solely to a given frequency channel.

According to a second non-limiting example, adjacent beams use one and the same frequency channel. However, two adjacent beams use two families of different CDMA spreading codes to distinguish their uplink communications. A frequency resource then corresponds to a given frequency channel combined with a given spreading code.

The notion of "multiplexing resource" can also be extended, within one and the same beam, to the means making it possible to distinguish the various blocks of resources allotted to different terminals. Indeed, if the terrestrial component uses the same splitting into blocks of resources as the satellite component, the invention can be implemented to directly determine the blocks of resources that can be used for the terrestrial communications.

According to a first example, if adjacent beams use different frequency channels, and if the blocks of resources correspond to frequency sub-channels, it will be possible to determine, in each frequency channel considered, which frequency sub-channels can be used for the terrestrial communications.

According to a second non-limiting example, if adjacent beams use different frequency channels, and if the blocks of resources correspond to CDMA spreading codes, it will be possible to determine, in each frequency channel considered, which CDMA spreading codes can be used for the terrestrial communications.

It should also be noted that the invention, described within the framework of a frequency multiplexing of the uplink and downlink communications (FDD), is applicable generally to any type of multiplexing of the uplink and downlink communications. According to another example, the invention is applicable to a temporal multiplexing (known by the acronym TDD for "Time Division Duplex"), in which one and the same frequency channel is used at one and the same time for uplink and downlink communications.

Furthermore, the invention is also applicable to a satellite placed in a non-geostationary orbit, such as an LEO low orbit ("Low Earth Orbit") or an MEO medium orbit ("Medium Earth Orbit").

Moreover, the invention is applicable to any type of terrestrial telecommunications system, such as the GSM, UMTS, CDMA 2000, LTE, WiMax, etc. systems. Furthermore, this invention can also be applied to terrestrial broadcasting systems which would desire to operate in part in the authorized satellite bands.

The invention finds an entirely advantageous application in terrestrial telecommunications systems using an air interface of the OFDMA ("Orthogonal Frequency Division Multiple Access") or MF/TDMA ("Multiple Frequency/TDMA") type, insofar as such air interfaces allow dynamic allocation of the frequency channels. Indeed, the operations described hereinabove, in particular the measurements of reception levels in direct visibility and/or the potential reception levels can be performed in a periodic manner with a view to allocating the frequency channels dynamically, so as to take account for example of the displacement of the terrestrial terminal 32 or of the satellite 20 (in the case of a traveling orbit), etc.

The description hereinabove clearly illustrates that, through its various characteristics and their advantages, the present invention achieves the objectives that it set itself.

In particular, the control of the interference experienced by the satellite 20 is obtained in particular while not authorizing the use of frequency channels in which the potential level of interference of a terrestrial terminal 32 is greater than the authorized maximum interference level.

Furthermore, the invention can be implemented in a manner transparent to the satellite system, without requiring coordination with the terrestrial telecommunications system, but simply by measuring the levels of reception of radio-electric signals transmitted by the satellite by the terrestrial terminal 32 and by a terrestrial device under conditions of direct visibility with the satellite 20.

The invention claimed is:

1. A method for identifying uplink multiplexing resources of a multi-beam satellite that can be used in a terrestrial telecommunications system by a transmitting station to transmit radio-electric signals to a receiving station, comprising the steps of:
    estimating a maximum interference level authorized with respect to the satellite for an uplink multiplexing resource for radio-electric signals transmitted from a zone of coverage, wherein the transmitting station or the receiving station is a base station having a range delimiting the zone of coverage in which the transmitting station is situated, and wherein different beams of satellite use different uplink multiplexing resources;
    estimating a radiation power of the radio-electric signals transmitted by the transmitting station;
    measuring, by the transmitting station, a real reception level of the radio-electric signals transmitted by the satellite;
    determining a potential level of interference of the transmitting station as a function of the real reception level measured and of the estimated radiation power of the transmitting station; and
    determining whether said uplink multiplexing resource is usable by the transmitting station by comparing the potential level of interference of the transmitting station with the maximum interference level authorized for said uplink multiplexing resource.

2. The method as claimed in claim 1, wherein the step of estimating the maximum interference level, comprises the steps of:
    measuring a reference reception level of radio-electric signals transmitted by the satellite in a beam using each uplink multiplexing resource considered by a terrestrial reference device situated in the zone of coverage under predetermined conditions of visibility with the satellite; and
    determining the maximum interference level authorized for said each uplink multiplexing resource considered as a function of the reference reception level measured for said each uplink multiplexing resource considered.

3. The method as claimed in claim 2, for said each uplink multiplexing resource considered, further comprising the step of transmitting, by the satellite, a specific pilot signal $S_x$ associated with said each uplink multiplexing resource considered in the beam using said each uplink multiplexing resource considered, the reference reception level for said each uplink multiplexing resource considered corresponds to the reception level of the pilot signal $S_x$ associated with said each uplink multiplexing resource considered.

4. The method as claimed in claim 3, for said each uplink multiplexing resource considered, further comprising steps of:
   measuring the real interference level generated by transmitting stations using said each uplink multiplexing resource considered; and
   updating of a transmission power of the pilot signal $S_x$ associated with said each uplink multiplexing resource considered by adjusting the transmission power of the pilot signal $S_x$ as a function of the real interference level measured for said each uplink multiplexing resource considered.

5. The method as claimed in claim 2, wherein the terrestrial reference device is the base station.

6. The method as claimed in claim 1, further comprising the step of transmitting a specific pilot signal $S'_x$ associated with each beam of the satellite, the real reception level of the transmitting station corresponds to a maximum reception level measured by the transmitting station for all pilot signals.

7. The method as claimed in claim 1, further comprising the step of transmitting one and same global pilot signal $S'_0$ in multiple beams of the satellite or in a global beam encompassing multiple beams of said satellite, the real reception level of the transmitting station corresponds to a reception level of the global pilot signal $S'_0$.

8. A terrestrial telecommunications system, comprising
   a transmitting station and a receiving station configured to exchange data by using uplink multiplexing resources of a multi-beam satellite, the transmitting station or the receiving station being a base station having a range delimiting the zone of coverage in which the transmitting station is situated; and
   a reference base station configured to: estimate a maximum interference level authorized with respect to the satellite for radio-electric signals transmitted from a zone of coverage for each uplink multiplexing resource considered; estimate a radiation power of the radio-electric signals transmitted by the transmitting station; measure a real reception level by the transmitting station of the radio-electric signals transmitted by the satellite; determine a potential level of interference of the transmitting station as a function of the measured real reception level and of the estimated radiation power; and determine whether an uplink multiplexing resource is usable by the transmitting station by comparing the potential level of interference of the transmitting station with the maximum interference level authorized for said uplink multiplexing resource.

9. The system as claimed in claim 8, wherein the reference base station is a terrestrial reference station situated or placed in the zone of coverage under predetermined conditions of visibility with the satellite; and wherein the reference base station is configured to measure reception levels of the radio-electric signals transmitted in downlink multiplexing resources of the satellite.

10. The system as claimed in claim 9, wherein the reference base station is the base station.

11. An integrated telecommunications system comprising a space component comprising a multi-beam satellite and a terrestrial component that complies with a terrestrial telecommunications system as claimed in claim 8.

12. The system as claimed in claim 11, wherein the satellite transmits a specific pilot signal in each beam of the satellite.

13. The system as claimed in claim 12, wherein the satellite updates a transmission power of each pilot signal as a function of measurements of a level of aggregated interference of transmitting stations using uplink multiplexing resources defined as a real interference level, wherein the satellite updates the transmission power of the pilot signal associated with an uplink multiplexing resource as a function of the real interference level measured in said uplink multiplexing resource.

14. The system as claimed in claim 11, wherein the satellite transmits one and same global pilot signal in multiple beams of the satellite or in a global beam encompassing multiple beams of the satellite.

* * * * *